(12) United States Patent
Vikberg et al.

(10) Patent No.: US 8,655,374 B2
(45) Date of Patent: Feb. 18, 2014

(54) MAINTAINING CURRENT CELL LOCATION INFORMATION IN A CELLULAR ACCESS NETWORK

(75) Inventors: Jari Vikberg, Jarna (SE); Thomas Johansson, Aby (SE); Magnus Hallenstal, Taby (SE); Tomas Nylander, Varmdo (SE); Goran Rune, Linköping (SE); Hakan Axelsson, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 219 days.

(21) Appl. No.: 13/141,305

(22) PCT Filed: Dec. 18, 2009

(86) PCT No.: PCT/IB2009/007823
§ 371 (c)(1),
(2), (4) Date: Jun. 21, 2011

(87) PCT Pub. No.: WO2010/073091
PCT Pub. Date: Jul. 1, 2010

(65) Prior Publication Data
US 2011/0256873 A1  Oct. 20, 2011

Related U.S. Application Data

(60) Provisional application No. 61/140,199, filed on Dec. 23, 2008.

(51) Int. Cl.
*H04W 24/00* (2009.01)
(52) U.S. Cl.
USPC .................................. 455/456.1; 455/456.5

(58) Field of Classification Search
USPC ...................... 455/435.1–435.2, 432.1–432.3
See application file for complete search history.

(56) References Cited

U.S. PATENT DOCUMENTS

| 2008/0020745 A1* | 1/2008 | Bae et al. ................... 455/422.1 |
| 2008/0102896 A1* | 5/2008 | Wang et al. .................... 455/560 |
| 2009/0047951 A1* | 2/2009 | Yeoum et al. ............... 455/435.1 |
| 2010/0113015 A1* | 5/2010 | Casati et al. ............... 455/432.1 |

FOREIGN PATENT DOCUMENTS

| WO | WO 2009/13493 A1 | 11/2009 |
| WO | WO 2009/134943 A1 | 11/2009 |

OTHER PUBLICATIONS

3GPP TR 23.879 V1.1.1; 3rd Generation Partnership Project; Technical Specification Group Services and System Aspects; Study on Circuit Switched (CS) domain services over evolved Packet Switched (PS) access; Stage 2 (Release 9); Available on Dec. 12, 2008; pp. 19-34.*

(Continued)

*Primary Examiner* — Wesley Kim
*Assistant Examiner* — Nam Huynh

(57) ABSTRACT

A system, method, and User Equipment, UE, for providing a current LTE cell location to a Generic Radio Access Network Controller, GANG, based on different triggers depending on the UE state. The GANC ensures that the correct GANG is serving the UE, and also maps the LTE cell location to an associated GAN Cell Global Identifier, GAN-CGI. The GANG provides the GAN-CGI to a Mobile Switching Center, MSC, or other serving core network node to support location-based services and other mobile originated or mobile terminated calls and transactions.

13 Claims, 11 Drawing Sheets

(56) References Cited

OTHER PUBLICATIONS

3GPP TS 43.318 V8.3.0; 3rd Generation Partnership Project; Technical Specification Group GSM/EDGE Radio Access Network; Generic Access Network (GAN); Stage 2 (Release 8); Available on Sep. 23, 2008; p. 69.*

"3rd Generation Partnership Project; Technical Specification Group Services and System Aspects; Study on Circuit Switched (CS) domain services over evolved Packet Switched (PS) access; State 2 (Release 9)" 3GPP Standard; 3GPP TR 23.879, 3rd Generation Partnership Project (3GPP), Mobile Competence Centre; 650, Route Des Lucioles: F-06921 Sophia Antipolis Cedex; France, No. v1.1.1, Dec. 1, 2008, pp. 1-56, XP050364075.

* cited by examiner

MAINTAINING CURRENT CELL LOCATION INFORMATION IN A CELLULAR ACCESS NETWORK

RELATED APPLICATIONS

This application claims the benefit of U.S. Provisional Application No. 61/140,199 filed Dec. 23, 2008.

TECHNICAL FIELD

The present invention relates generally to communication networks, and in particular, to a system and method for maintaining current cell location information in a cellular access network.

BACKGROUND

The following abbreviations are utilized throughout this document:
3GPP Third Generation Partnership Project
AGW Access Gateway
AS Application Server
BSSAP Base Station System Application Part
BSSMAP Base Station System Management Application Part
CM Connection Management
CSoLTE Circuit Switched Services over LTE Radio Access
CSoLTE-D CS over LTE Decoupled
CSoLTE-I CS over LTE Integrated
CSoLTEvGAN CS over LTE utilizing GAN Protocols
CS Circuit-Switched
DTM Dual Transfer Mode
E-CGI E-UTRAN Cell Global Identifier
eMSC-S evolved MSC Server
EPC Evolved Packet Core
EPS Evolved Packet System
E-UTRAN Evolved UTRAN
FDMA Frequency Division Multiple Access
GA-CSR Generic Access, Circuit Switched Resources
GAN Generic Access Network
GANC Generic Access Network Controller
GAN-CGI GAN Cell Global Identifier
GA-RC Generic Access Resource Control
GSM Global System for Mobile Communications
IASA Inter-Access Anchor
IMS IP Multimedia Subsystem
IWU Interworking Unit
LAI Location Area Identifier
LTE Long Term Evolution
LU Location Update
MME Mobility Management Entity
MO Mobile Originated
MT Mobile Terminated
MSC-S Mobile Switching Center Server
MSS Mobile Softswitch Solution
NAS Non Access Stratum
OFDM Orthogonal Frequency Division Multiplexing
PCRF Policy Charging Rule Function
PDN Packet Data Network
PMSC Packet MSC
PCSC Packet CS Controller
P-GW Packet Data Network Gateway
PS Packet-Switched
RRC Radio Resource Control
SAE System Architecture Evolution
SAE-GW SAE Gateway
SAI Service Area Identifier
SCCP Signaling Connection Control Part
SC-FDMA Single Carrier Frequency Division Multiple Access
SEGW Security Gateway
SGSN Serving GPRS Support Node
S-GW Serving Gateway
SMS Short Message Service
TA Tracking Area
TAU Tracking Area Update
UE User Equipment
UMA Unlicensed Mobile Access
UPE User Plane Entity
UTRAN Universal Terrestrial Radio Access Network
VLR Visitor Location Register
WCDMA Wideband Code Division Multiple Access Mobile CS services based on GSM and WCDMA radio access are a world-wide success story and provide telecommunication services with a single subscription in almost all countries of the world. The number of CS subscribers is still growing rapidly, boosted by the rollout of mobile CS services in dense population countries such as India and China. This success story is furthermore extended by the evolution of the classical MSC architecture into a softswitch solution, which utilizes a packet transport infrastructure for mobile CS services.

Recently, the 3GPP work item "Evolved UTRA and UTRAN" (i.e., E-UTRAN, started in summer 2006) defined a Long-Term Evolution (LTE) concept that assures competitiveness of 3GPP-based access technology. It was preceded by an extensive evaluation phase of possible features and techniques in the RAN workgroups that concluded that the agreed system concepts can meet most of the requirements and no significant issue was identified in terms of feasibility.

LTE utilizes OFDM radio technology in the downlink and SC-FDMA for the uplink, allowing at least 100 Mbps peak data rate for downlink data rate and 50 Mbps for uplink data rate. LTE radio can operate in different frequency bands and is therefore very flexible for deployment in different regions of the world.

In parallel with the LTE RAN (E-UTRAN) standardization, 3GPP also drives a System Architecture Evolution (SAE) work item to develop an Evolved Packet Core (EPC) network. The E-UTRAN and EPC together build up the Evolved Packet System (EPS). The SAE core network is made up of core nodes, which may be grouped into Control Plane (Mobility Management Entity or MME) nodes and User Plane nodes such as Serving Gateway (S-GW) and Packet Data Network Gateway (PDN GW or P-GW). In this document, a co-location of the S-GW and the P-GW is denoted Access GW (AGW).

FIG. 1 is a simplified block diagram of nodes in a conventional LTE/SAE network architecture 10. The SAE CN includes core nodes, which may be further split into a Control Plane Mobility Management Entity (MME) node 11 and a User Plane SAE Gateway (SAE-GW) node 12. In the terminology currently used, the SAE-GW contains both User Plane Entity (UPE) and Inter-Access Anchor (IASA) functionality. The SAE-GW also has two different roles defined: Serving Gateway 13 and Packet Data Network (PDN) Gateway 14. The term SAE-GW is used herein for both the Serving GW and the PDN GW. The MME 11 is connected to the E-UTRAN 15 via an S1-MME interface 16, and the SAE-GW 12 is connected to the E-UTRAN via an S1-U interface 17. The SAE architecture is further described in 3GPP TS 23.401 and 23.402.

Common to both LTE and SAE is that only a Packet Switched (PS) domain was initially to be specified, i.e., all services were to be supported via the PS domain. GSM (via DTM) and WCDMA, however, provide both PS and CS access simultaneously. Thus, if telephony services are to be deployed over LTE radio access, an IMS-based service engine is mandatory. It has been recently investigated how to use LTE/SAE as access technology to the existing Mobile Softswitch Solution (MSS) infrastructure. This work, referred to as "CS over LTE" (CSoLTE) or the longer name "CS domain services over evolved PS access," is documented in 3GPP TR 23.879 and in 3GPP TS 23.272.

FIG. 2 is a simplified block diagram of a CSoLTE general architecture 20. A Packet MSC (PMSC) 21 serves both traditional 2G and 3G RANs 22 and the CSoLTE solutions through the LTE E-UTRAN 15. The PMSC contains two new logical functions: a Packet CS Controller (PCSC) 23 and an Interworking Unit (IWU) 24. In addition, there is an SGs interface 25 between the MME 11 and an MSC Server (MSC-S) 26. This interface is used for Paging and Mobility Management (MM) signaling to attach a mobile station (MS) 27 in the MSC-S based on, for example, SAE MM procedures performed between the terminal and the MME using procedures similar to those for the Gs-interface between the MSC and SGSN in existing GSM and WCDMA networks and defined in 3GPP TS 29.016 and 29.018. The protocol used in the Gs-interface is called BSSAP+ and uses connectionless SCCP and normal MTP layers (or M3UA with SIGTRAN) in the existing implementations.

The communication between the MS 27 and the PMSC 21 is based on the SGi interface. This means that all direct communication between the MS and the PCSC 23 and the IWU 24 in the PMSC is based on IP protocols, and that the MS is visible and reachable using an IP-address via the SAE-GW 12 (FIG. 1). This communication is divided into two different interfaces: U8c for the control plane and U8u for the user plane. The PCSC has also an Rx interface to a Policy Charging Rule Function (PCRF) 28 for allocation of LTE/SAE bearers.

FIG. 3 is a simplified block diagram of the CSoLTE architecture illustrating the interfaces in more detail.

With reference to FIGS. 1-3, three different embodiments for providing CSoLTE service are described below. The first embodiment is called "CS Fallback" and means that the MS 27 is performing SAE MM procedures towards the MME 13 while camping on LTE access. For example, the MME registers the MS in the MSC-S 26 for CS-based services using the SGs interface 25 shown in FIG. 2. When a page for CS services is received in the MSC-S, the page is forwarded via the SGs interface to the MME 11 and then to the MS, which performs fallback to the 2G or 3G RANs 22. The fallback can be based on PS HO, Cell Change order, or terminal-based selection of the suitable cell in the 2G or 3G RAN. Similar behavior applies for Mobile Originated (MO) CS services. When these are triggered and the MS is camping on LTE access, the MS falls back to the 2G or 3G RANs and triggers the initiation of the CS service there.

The second embodiment is called CS over LTE Integrated (CSoLTE-I). In this embodiment, the same SAE MM procedures as for "CS Fallback" are used over the SGs interface 25, but instead of performing fallback to the 2G or 3G RANs, the MS performs all the CS services over the LTE E-UTRAN 15. This means that the CS services (also called Connection Management (CM) procedures) are transported over IP-based protocols between the PMSC 21 and the MS over the U8c and U8u interfaces using the LTE E-UTRAN and the SAE nodes such as the SAE-GW 12.

The third embodiment is called CS over LTE Decoupled (CSoLTE-D). In this embodiment, both MM and CM procedures are transported over IP-based protocols directly between the PMSC 21 and the terminal 27 over the U8c and U8u interfaces using the LTE E-UTRAN 15 and the SAE user plane nodes such as the SAE-GW 12.

FIG. 4 illustrates the control plane protocol architecture (i.e., the U8c interface) between the MS 27 and the PMSC 21.

FIG. 5 illustrates the user plane protocol architecture (i.e. the U8u interface) between the MS 27 and the PMSC 21.

FIG. 6 is a functional block diagram of an existing Generic Access Network (GAN) as defined in 3GPP TS 43.318 and TS 44.318. 3GPP has standardized the Generic Access Network (GAN)-concept starting from 3GPP Release-6. The more correct name is "Generic Access to A/Gb Interfaces" and this standardization was based on the Unlicensed Mobile Access (UMA) de-facto specifications.

The GAN provides a new Radio Access Network (RAN) and the node corresponding to the GERAN BSC is called a Generic Access Network Controller (GANC). The basic principle is that the MS is a dual-mode, dual-radio handset including for example both WiFi and 3GPP-macro radio support (GSM, WCDMA, or both). The MS connects to a WiFi Access Point (AP) (not shown) using the WiFi Radio. The GAN standard defines for example how the MS can function in GAN mode and access the services provided by the GSM Core Network (CN) using the Up-interface between the MS and the GANC.

The initial GAN standard can be called "2G-GAN" or "GSM-GAN" since the standard GSM interfaces, A and Gb, are used between the GANC and the CN 37. In addition, work is ongoing to standardize a "3G-GAN" or "WCDMA-GAN" solution. In this case, the GANC will use the standard WCDMA interfaces, for example the Iu-cs and the Iu-ps interfaces, to connect to the CN. The resulting standard can be also called "Generic Access to A/Gb Interfaces" or shortly "GAN-Iu".

FIG. 7 illustrates the CS Domain Control Plane Protocol Architecture related to GAN and the Up-interface 36. The GANC uses the normal A-interface signaling towards the MSC 38 and interworks the related protocol, such as BSSAP, towards the relevant GAN-protocols, such as GA-CSR (Generic Access, Circuit Switched Resources), in both directions.

FIG. 8 is a functional block diagram of the CSoLTEvGAN architecture. The CSoLTEvGAN solution has not yet been standardized, but exists in 3GPP TR 23.879 as one of the alternatives for CS service support over LTE. TR 23.879 covers a number of different alternatives. This alternative basically views LTE as a Generic Access Network and utilizes the GAN protocols for the control and user planes.

SUMMARY

When a UE registers in one TA, the GANC selects a GAN cell and a GAN Cell Global Identifier, GAN-CGI. However, when the UE moves between different LTE cells, this relationship may not stay accurate because the GAN registration update procedure is only triggered when the UE changes to an LTE cell in a different TA.

When a call is set up, the CGI sent to the MSC in the 48.008 COMPLETE LAYER 3 message is the GAN-CGI selected during the GAN registration or registration update procedure. This CGI may be used for Location Based Services in the MSC or for routing of emergency calls to the proper emergency centre.

If the UE has changed LTE-cells, but has not moved to a different TA after the last GAN registration or registration update procedure, the CGI will not represent the correct LTE cell. This mismatch could lead to improper behavior of Location Based Services or routing to the wrong emergency center. The present invention provides a solution to this mismatch problem.

In an embodiment of the present invention, the UE provides information to the GANC about the current LTE/SAE cell and tracking area based on different triggers depending on the UE state. The information provided to the GANC may result in various actions by the GANG and the main purpose is to provide location information with the proper resolution to the MSC. The different UE triggers and GANG actions are described in the detailed description below.

The invention performs methods that ensure the GANC retrieves more accurate information about the UE location. This information is used for two different purposes: firstly to ensure that the correct GANC is serving the UE, and secondly to ensure that the GANC can select an accurate GAN cell and GAN-CGI and use these towards the MSC as needed (for example, when new signaling connections are established either for mobile originated or mobile terminated calls and other transactions).

In one embodiment, the UE indicates the current LTE cell location to the GANC every time the UE performs a Tracking Area Update (TAU) in the LTE/SAE network. The updated LTE cell information enables the GANC to ensure that the UE is redirected to the correct GANC already in idle state.

In a second embodiment, the UE indicates the current LTE cell location to the GANC every time the UE establishes a signaling connection towards the GANC and the MSC. The updated LTE cell information enables the GANC to select a new GANC cell and GAN-CGI and use this towards the MSC.

Thus, in one embodiment, the present invention is directed to a method of providing a core network with a current cell location of a UE operating in a CSoLTEvGAN network. The network includes a plurality of LTE cells associated with an LTE Tracking Area, TA, and wherein when the UE registers with a GANC from a first LTE cell, the GANC selects a first GAN-CGI associated with the first LTE cell for reporting the location of the UE to the core network. The method includes the steps of reporting by the UE to the GANC that the UE has moved from the first LTE cell to a second LTE cell within a first TA; selecting by the GANC, a second GAN-CGI associated with the second LTE cell; and reporting by the GANC, the second GAN-CGI to the core network.

In another embodiment, the present invention is directed to a method of providing a core network with a current cell location of a UE operating in a CSoLTEvGAN network in which a plurality of LTE cells are associated with an LTE TA. Wherein when the UE registers with a GANC from a first LTE cell, the GANC selects a first GAN-CGI associated with the first LTE cell for reporting the location of the UE to the core network. The method comprises the steps of reporting by the UE to the GANC that the UE has moved from the first LTE cell to a second LTE cell; determining by the GANC, whether the UE should be served by a second GANC based on the reported second LTE cell or associated TA; and upon determining that the UE should be served by a second GANC, redirecting the UE report to the second GANC. The second GANC then selects a second GAN-CGI associated with the second LTE cell, and reports the second GAN-CGI to the core network.

In another embodiment, the present invention is directed to a method of providing a core network with a current cell location of a UE operating in a CSoLTEvGAN network. The method includes the steps of the UE detecting a triggering event; in response to detecting the triggering event, the UE reporting the UE's current LTE cell to a GANC; and the GANC reporting to the core network, a GAN-CGI associated with the UE's current LTE cell. The triggering event may be selected from a group of events comprising:

the UE establishing a signaling connection with the GANC;
the UE moving from a first LTE cell to a second LTE cell within a single LTE TA;
the UE moving from a first LTE cell in a first TA to a second LTE cell in a second TA;
the UE performing a TAU while the UE is in CS Idle state;
the UE performing a TAU while the UE is in CS Active state;
handover of the UE from a first GANC to a second GANC while the UE is in CS Active state;
handover of the UE from a GERAN/UTRAN access network to the CSoLTEvGAN network; and
expiration of a GAN Keep Alive timer in the UE.

In another embodiment, the present invention is directed to a system for providing a core network with a current cell location of a UE operating in a CSoLTEvGAN network. The system includes a UE and a GANC. The UE includes a triggering event detector for detecting when a triggering event has occurred and for generating a notification that the event has occurred; and a current LTE cell transmitter for sending an indication of the UE's current LTE cell to the GANC in response to the notification from the triggering event detector. The GANC includes a current LTE cell receiver for receiving the indication of the UE's current LTE cell from the UE; a mapping unit for determining a GAN-CGI associated with the UE's current LTE cell; and a GAN-CGI reporting unit for reporting the GAN-CGI to the core network.

In another embodiment, the present invention is directed to a UE for providing a core network with a current cell location of the UE in a CSoLTEvGAN network. The UE includes a triggering event detector for detecting when a triggering event has occurred and for generating a notification that the event has occurred; and a current LTE cell transmitter for sending, in response to the notification from the triggering event detector, an indication of the UE's current LTE cell to a GANG for forwarding to the core network. The triggering event may be selected from the group of events described above.

DETAILED DESCRIPTION

Figure 1:
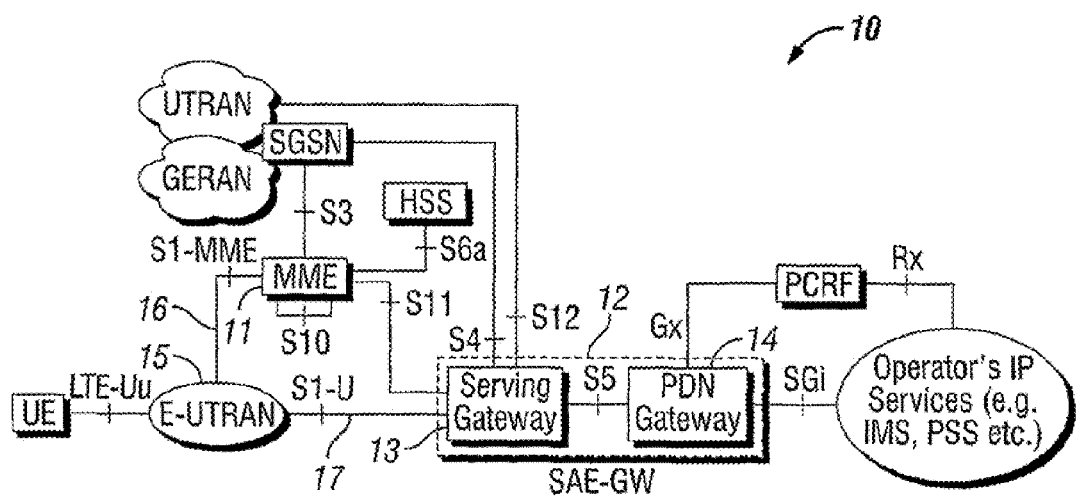
FIG. 1 is a simplified block diagram of nodes in a conventional LTE/SAE network architecture.
Figure 2:
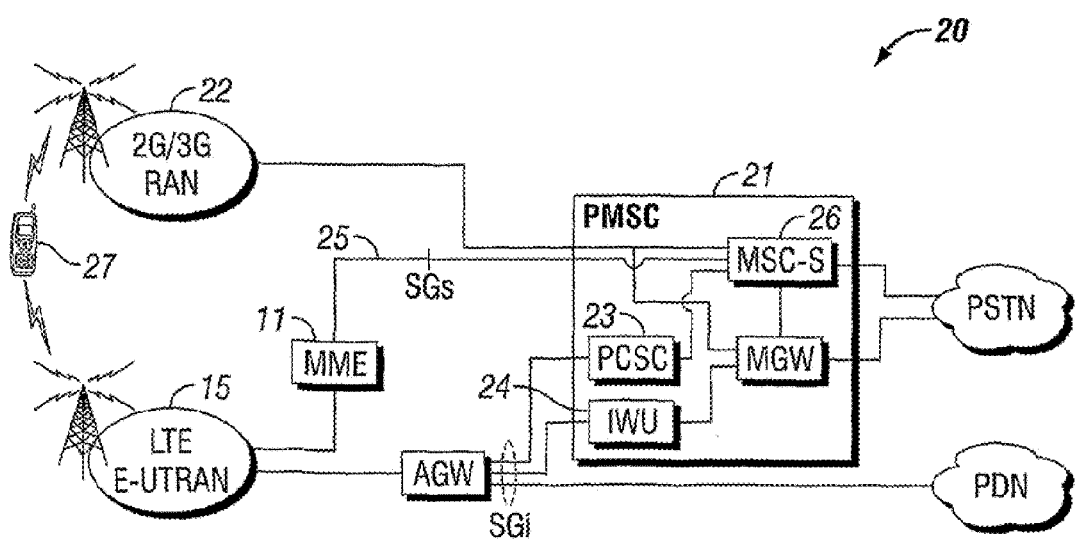
FIG. 2 is a simplified block diagram of a CSoLTE general architecture.
Figure 3:
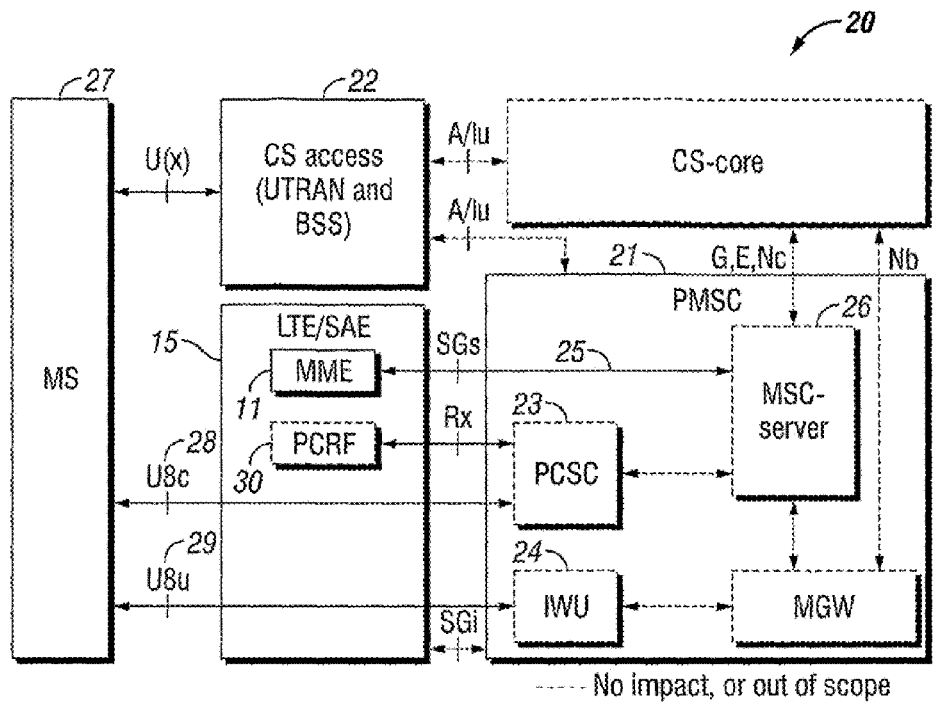
FIG. 3 is a simplified block diagram of the CSoLTE architecture illustrating the interfaces in more detail.
Figure 4:
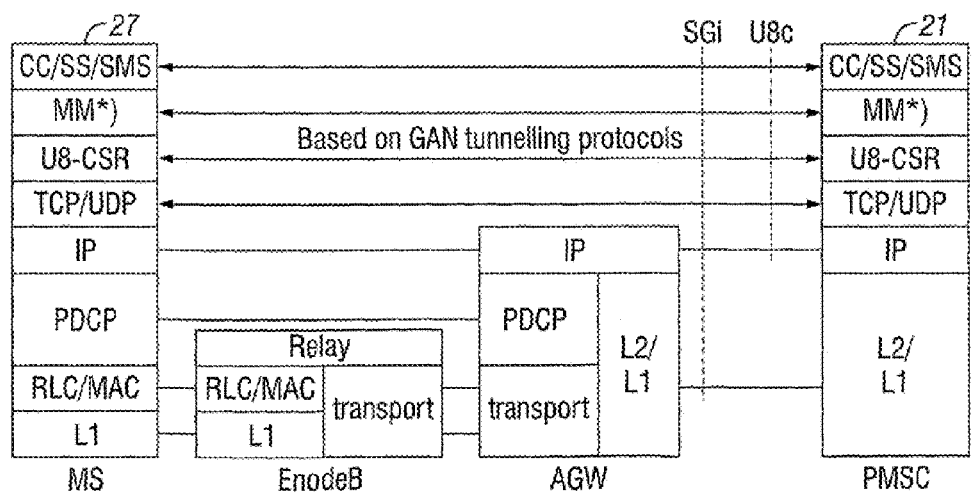
FIG. 4 illustrates the control plane protocol architecture (i.e., the U8c interface) between the MS and the PMSC.
Figure 5:
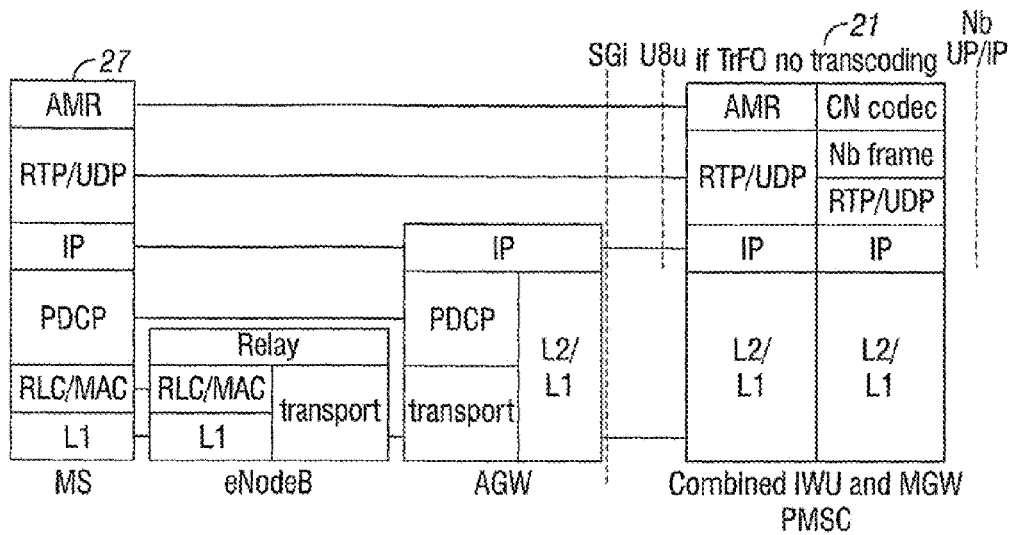
FIG. 5 illustrates the user plane protocol architecture (i.e., the U8u interface) between the MS and the PMSC.
Figure 6:
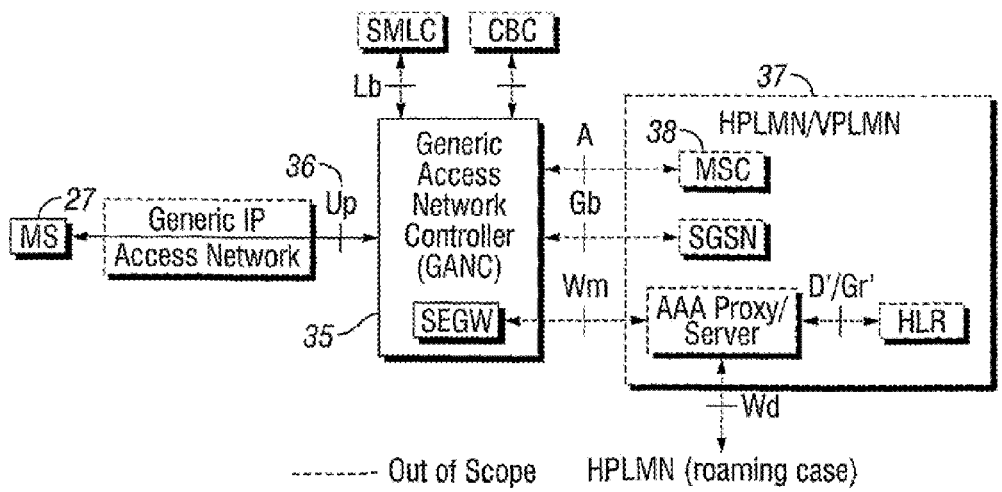
FIG. 6 is a functional block diagram of an existing Generic Access Network (GAN)
Figure 7:
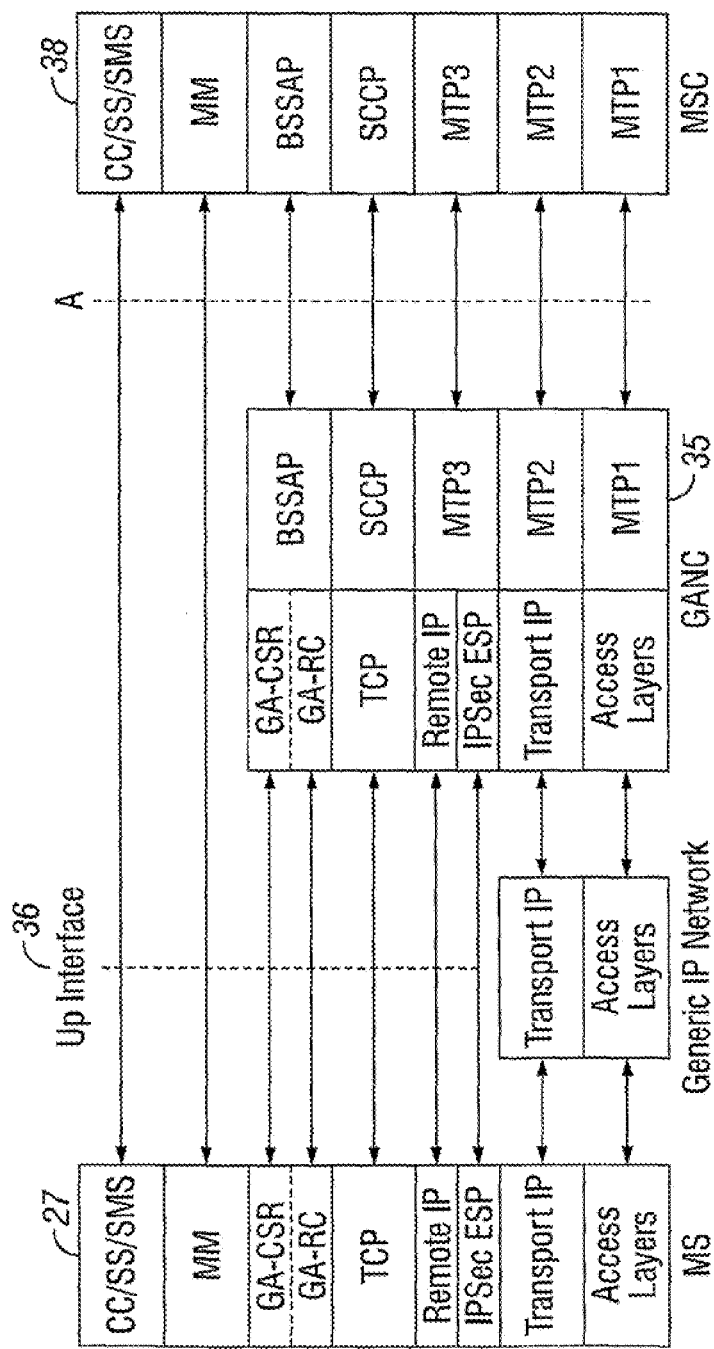
FIG. 7 illustrates the CS Domain Control Plane Protocol Architecture related to GAN and the Up-interface.
Figure 8:
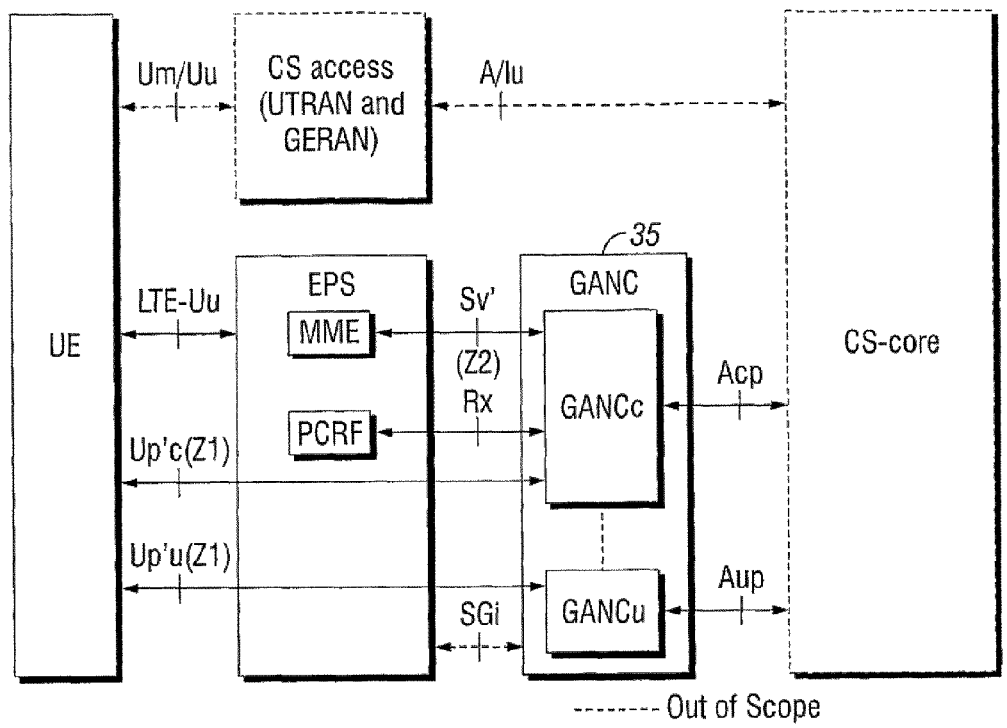
FIG. 8 is a functional block diagram of an existing CSoLTEvGAN architecture.
Figure 9:
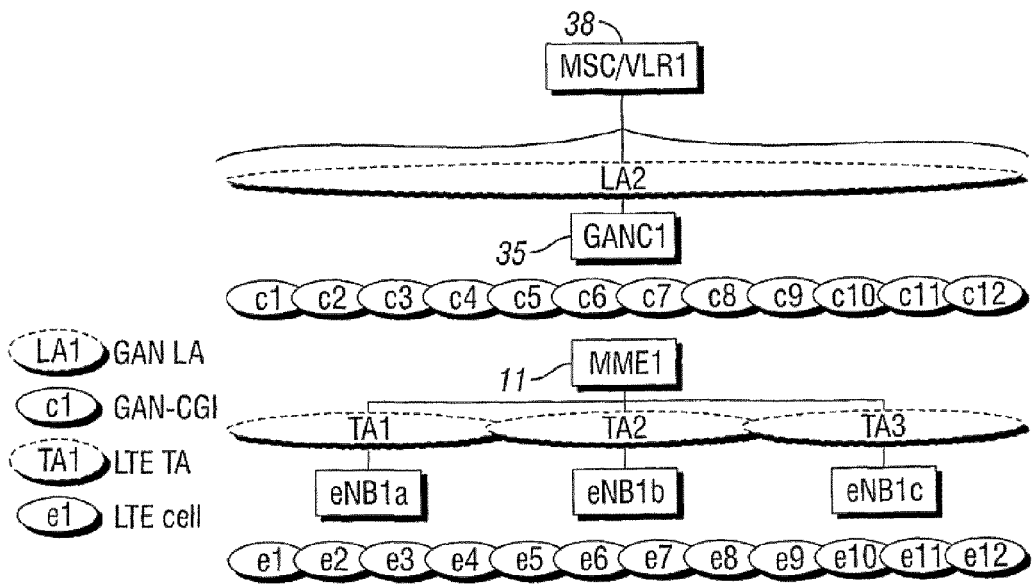
FIG. 9 illustrates an exemplary mapping from LTE cells and Tracking Areas (TAs) to GAN cell/Cell Global Identifier (GAN-CGI) and Location Area (LA)

FIG. 9 illustrates an exemplary mapping from LTE cells and Tracking Area (TA) to GAN-CGI and Location Area (LA). As noted above, a major difference for the GANG 35 in the CSoLTEvGAN solution compared to the GAN solution is that handover is triggered using the SRVCC procedures over the Sv' interface. Another important difference is the TA concept and the impact this has on the GAN registration procedure. TA is an area concept within LTE similar to Location Areas and Routing Areas within GSM. In an embodiment of the present invention, the UE triggers the GAN registration procedure when the UE enters LTE coverage. The GAN registration update procedure is triggered each time the UE changes TA. At each registration and registration update procedure, the UE includes the LTE cell to which the UE is connected. The LTE cell may be identified by both Tracking Area Identity (TAI) and E-UTRAN Cell Global Identifier (E-CGI). Based on the LTE cell, the GANC 35 selects a GAN cell and a CGI (together, GAN-CGI) utilizing GSM format. The GAN-CGI is used towards the Core Network (CN), in this case the MSC/VLR 38, whenever the UE initiates the establishment of a signaling connection towards the MSC. The CGI is included in a 48.008 COMPLETE LAYER 3 message. The MSC can use this CGI for different Location Based services such as finding the nearest restaurant or for Emergency Call Routing.

FIG. 9 illustrates the specific case in which one GAN-cell c1-c12 exists for each LTE cell e1-e12. However, other mappings are also possible, for example one GAN-cell for a TA or a group of LTE cells. Each GAN-cell has an associated GAN-CGI. The lower part of the figure illustrates an LTE/SAE network with multiple LTE cells e1-e12. In addition, three eNodeBs and TAs are shown for completeness, but may be ignored for this example. The upper part of the figure illustrates an overlay GAN-CGI network. For each LTE cell, there exists a GAN-cell and associated GAN-CGI, denoted as c1-c12. The GAN-CGIs are logical rather than physical areas and are only used by the GANC 35 to inform the MSC/VLR 38 about the location of the UE using the mechanism and identifiers that are possible over the A-interface. For example, when the UE is located in LTE cell e3, the GAN-cell and associated GAN-CGI c3 can be used to indicate the current location to the MSC/VLR.

Finally, regarding the GAN solution as it pertains to the present invention, it is noted that in GAN, the UE normally uses a single WiFi/WLAN Access Point (AP) to obtain connectivity to the GANC 35. This AP is normally not moving and provides a limited coverage area. Therefore it is sufficient to know the location of the AP to be able to indicate the location of a UE accessing the AP. For this reason, the GAN standard only indicates the location of the AP during registration and registration updates. This location is normally indicated as the GERAN or UTRAN cell covering the location of the AP. In an embodiment of the present invention, the GANC selects a GAN-cell and GAN-CGI during registration (or registration update) and then uses the GAN-CGI for all consecutive signaling connection establishments.

As noted above, when a UE registers in one TA, the GANC 35 selects a GAN-cell and associated GAN-CGI. Under existing procedures, however, this relationship may not remain accurate when the UE moves between different LTE cells because the GAN registration update procedure is only triggered when the UE changes to an LTE cell in a different TA. When a call is set up, the CGI sent to the MSC in the 48.008 COMPLETE LAYER 3 message is the GAN-CGI selected during the GAN registration or registration update procedure. This CGI may be used for Location Based Services in the MSC or for routing of emergency calls to the proper emergency center. However, if the UE has changed LTE-cells, but has not moved to a different TA after the last GAN registration or registration update procedure, the CGI will not represent the correct LTE cell. This mismatch could lead to improper behavior of Location Based Services or routing to the wrong emergency center.

The present invention performs methods that ensure that the GANC retrieves more accurate information about the UE location. This information is used for two different purposes: firstly to ensure that the correct GANC is serving the UE, and secondly to ensure that the GANC can select an accurate GAN-cell and GAN-CGI and use these towards the MSC/VLR as needed (i.e., when new signaling connections are established either for mobile originated or mobile terminated calls and other transactions).

In one embodiment of the present invention, the UE sends a location indication to the GANC 35 every time the UE performs a Tracking Area Update (TAU) procedure in the LTE/SAE network. In this way, the UE and the GANC can ensure that the UE is connected to the correct GANG in the network. The location indication enables the GANC to ensure that the UE is redirected to the correct GANC already in idle state.

Figure 10:
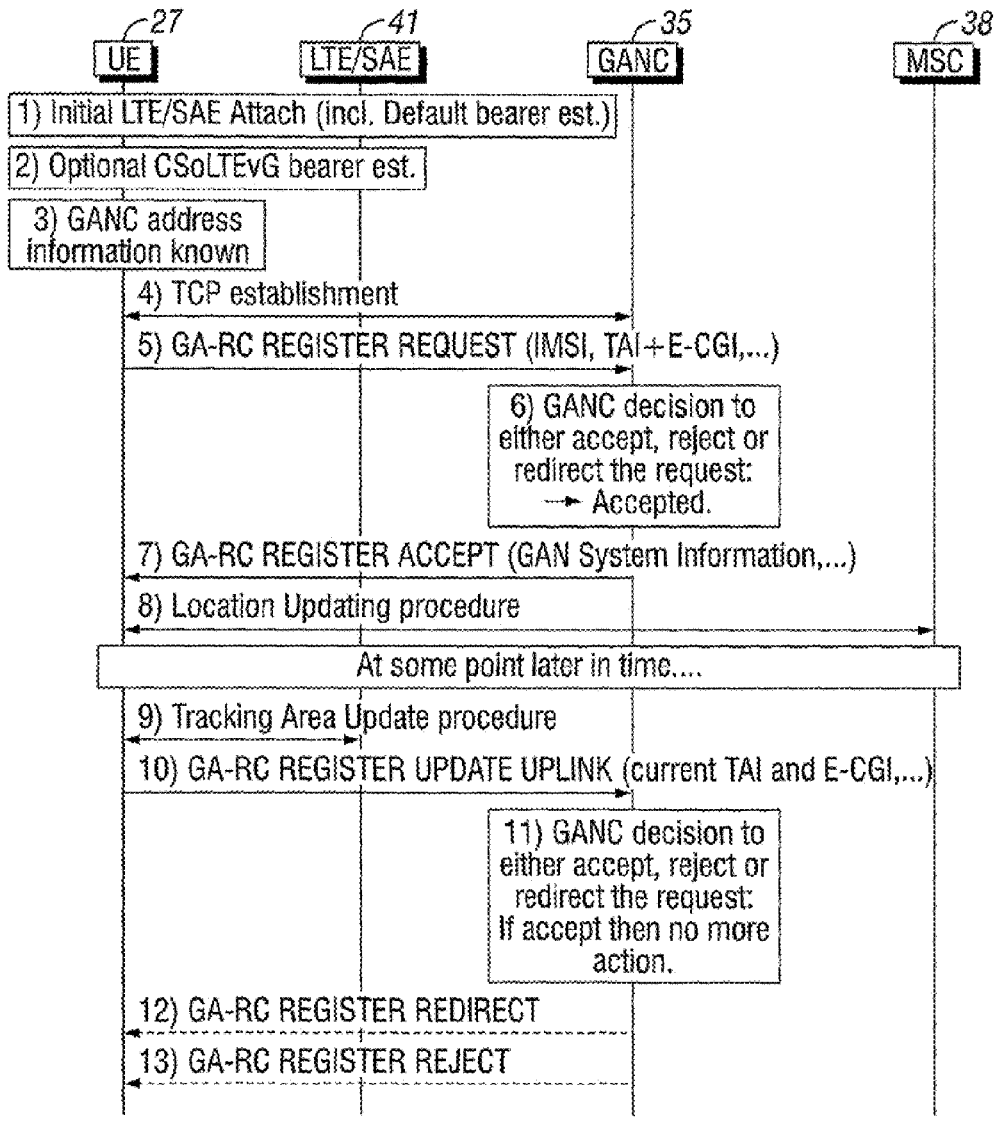
FIG. 10 is a message flow diagram illustrating the signaling performed when maintaining a current TA indication in the GANC in an exemplary embodiment of the present invention.

FIG. 10 is a message flow diagram illustrating the signaling performed between the UE 27, LTE/SAE network 41, and the GANG 35 when maintaining a current TA indication in the GANC in an exemplary embodiment of the present invention. The initial steps 10/1-8 show the normal procedures for attaching the UE to the LTE/SAE network and performing a GAN registration procedure to the GANG. At step 10/6, the GANG ensures that the selected GANG is the correct GANG for the UEs current location in the LTE/SAE network. This GANG decision is based on the TAI and E-CGI of the current LTE cell as provided by the UE in step 10/5.

At some later point in time, the UE performs a TAU procedure in the LTE/SAE network as shown in step 10/9. This TAU may be of any type (for example a periodic or normal TAU) and is the trigger for the UE to perform the GAN Registration Update procedure towards the GANC in step 10/10. The UE includes information about the current LTE cell (i.e., TAI and E-CGI) in the update message. At step 10/11, the GANG again verifies and decides which GANG should serve the UE in the current location in the LTE/SAE network. If the same GANG is still to serve the UE, then no more actions are triggered towards the UE. If the GANG determines that another GANG should serve the UE, then the GAN Register Redirect procedure is triggered in step 10/12. Alternatively, it is also possible that the UE has moved to a location where it is not allowed to use GAN anymore. In this case, the GANG rejects the UE's current registration in step 10/13.

Thus in this embodiment, the UE 27 triggers the GAN registration update procedure when performing a TAU in the LTE/SAE network 41. This ensures that the UE will subsequently set up the GAN signaling connection towards the correct GANC that covers the TA where the UE is located and to be able to know the location of the UE. This eliminates the possibility that the UE must be redirected to another GANC during the GAN signaling connection establishment procedure, which could lead to long call-setup times.

In another embodiment of the present invention, the UE 27 may indicate the current LTE cell to the GANG 35 every time the UE begins to establish a signaling connection towards the GANG and the MSC 38. This provides the GANC with the ability to select a new GAN-cell and GAN-CGI, and to utilize the GAN-GCI towards the MSC as the CGI in the 48.008 COMPLETE LAYER 3 message to represent the UE's current LTE cell. There are two different variants of this method depending on whether the signaling connection is established due to Mobile Originated (MO) action or due to Mobile Terminated (MT) action as shown in FIGS. 11 and 12, respectively.

Figure 11:
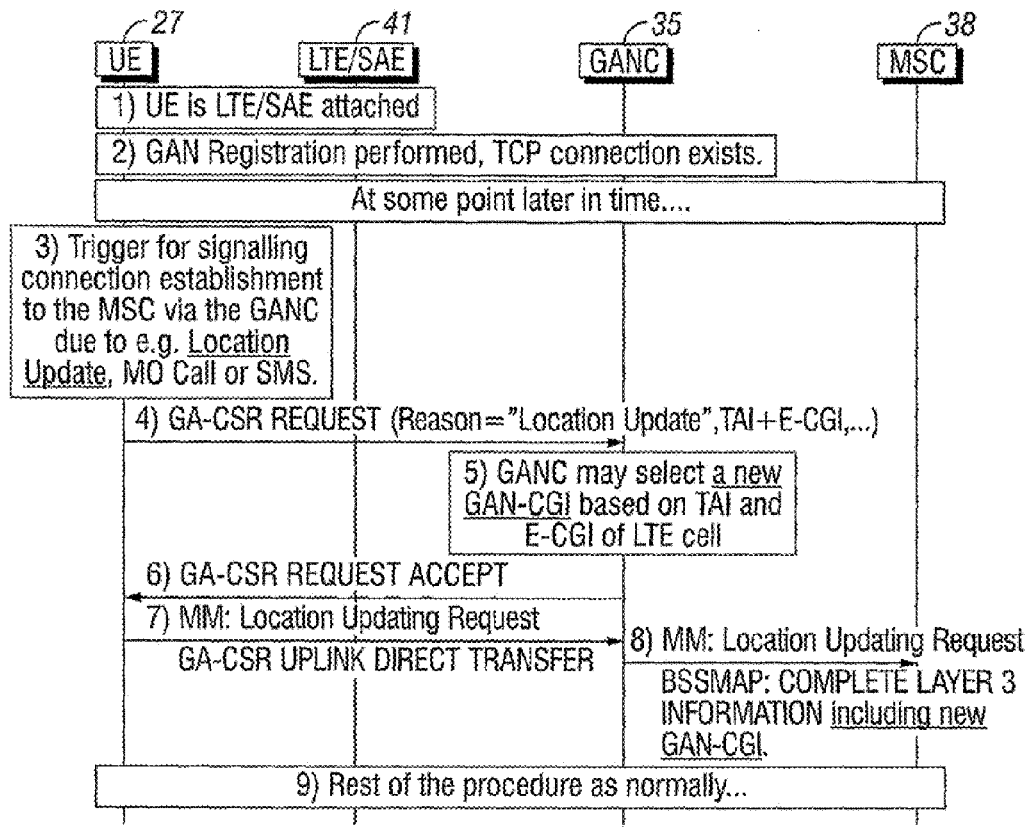
FIG. 11 is a message flow diagram illustrating the signaling performed when the UE indicates the current LTE cell to the GANC at connection establishment in the MO case in an exemplary embodiment of the present invention.

FIG. 11 is a message flow diagram illustrating the signaling performed between the UE 27, LTE/SAE network 41, and the GANG 35 when the UE indicates the current LTE cell to the GANC at connection establishment in the MO case. There are multiple different possible triggers in this case, for example Location Update (LU) or MO call, or SMS origination. FIG. 11 illustrates the signaling using an LU as an example.

When the UE 27 initiates the establishment of the GA-CSR signaling connection towards the GANG, it includes the TAI and E-CGI of the current LTE cell in the GA-CSR REQUEST message at step 11/4. In step 11/5, the GANG utilizes the received information to select a new GAN-CGI. At step 11/8, the new GAN-CGI is used towards the MSC 38 for this signaling connection.

Figure 12:
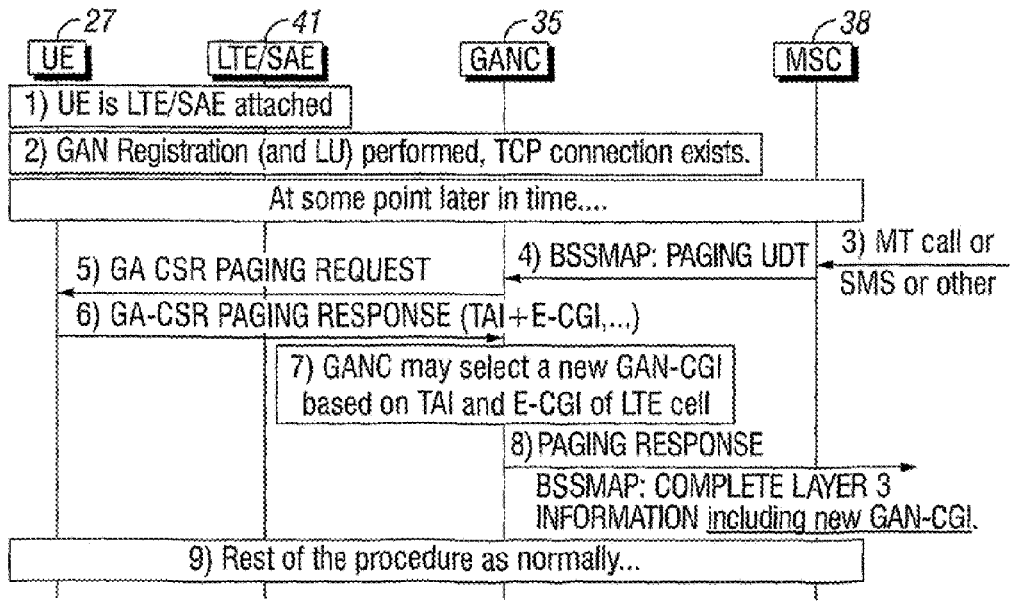
FIG. 12 is a message flow diagram illustrating the signaling performed when the UE indicates the current LTE cell to the GANC at connection establishment in the MT case in an exemplary embodiment of the present invention.

FIG. 12 is a message flow diagram illustrating the signaling performed between the UE 27, LTE/SAE network 41, and the GANG 35 when the UE indicates the current LTE cell to the GANC at connection establishment in the MT case. The main trigger in this case is the Paging message (i.e., GA-CSR PAGING REQUEST) received from the MSC via the GANC in step 12/5. When the UE replies to the Paging message, it includes the TAI and E-CGI of the current LTE cell in the GA-CSR PAGING RESPONSE message at step 12/6. In step 12/7, the GANC utilizes the received information to select a new GAN-CGI, which is used towards the MSC 38 for this signaling connection at step 12/8.

In an alternative embodiment, the GAN registration update procedure is always triggered before the establishment of a GAN signaling connection.

Figure 13:
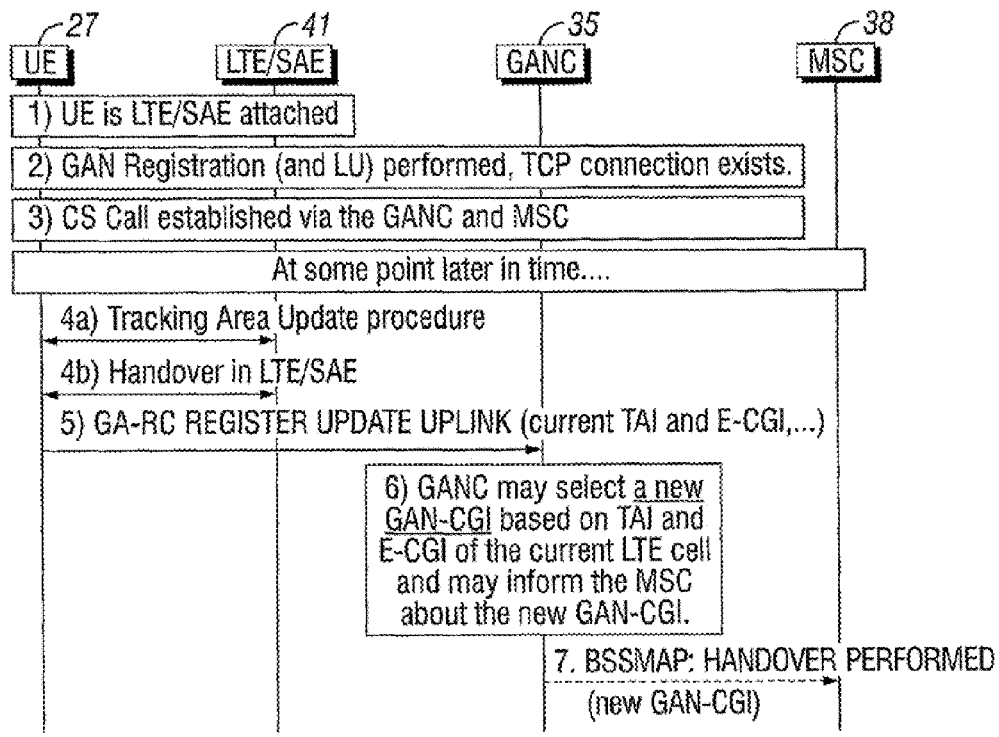
FIG. 13 is a message flow diagram illustrating the signaling performed when the UE is in CS active state (e.g., CS call) via the GANC and MSC in an exemplary embodiment of the present invention.

FIG. 13 is a message flow diagram illustrating the signaling performed between the UE 27, LTE/SAE network 41, GANC 35, and MSC 38 when the UE is in CS active state (e.g., CS call) via the GANC and MSC. If the UE moves in the LTE/SAE network during this call, the GANC needs to be able to indicate this movement to the MSC. The UE can inform the GANC about this based on the following two different triggers:

TAUs are also performed in LTE/SAE connected mode, and the UE utilizes the TAU as a trigger to perform the registration update uplink procedure.

The handover procedure in the LTE/SAE network triggers the UE to inform the GANC about the new LTE cell.

Both of these triggers are shown in FIG. 13, which also shows that the GANC 35 may utilize the received information to select a new GAN-CGI and inform the MSC 38 at step 13/7 with the BSSMAP: HANDOVER PERFORMED message about the newly selected GAN-CGI. Step 13/4*a* shows the case in which the TAU triggers the GAN registration update, and step 13/4*b* shows the alternative case in which a handover in the LTE/SAE network triggers the GAN registration update.

It is also necessary to indicate the UEs location in the LTE/SAE network to the GANC during a handover from a GERAN/UTRAN network to a CSoLTEvGAN network. Although procedures for this handover are not yet defined, it is assumed that this procedure will end with the UE sending a GA-CSR HANDOVER ACCESS to the GANC to indicate that the handover is about to be finalized. In an embodiment of the present invention, the UE in this case may include the TAI and E-CGI of the target LTE cell in this message. The GANG can then utilize the received information to select a new GAN-CGI and inform the MSC with the BSSMAP: HANDOVER PERFORMED message about the newly selected GAN-CGI.

Alternatively, the MSC may base any location-based services on the MSC's knowledge of the source cell when the handover is performed. Likewise, the GANC may select a GAN-CGI based on information received about the source GERAN/UTRAN cell during the handover preparation phase.

In another embodiment, location indications may be sent to the GANC 35 utilizing the GAN Keep Alive signaling procedure. This procedure is well defined for example in the 3GPP Technical Specifications for GAN (43.318 and 44.318). When the GAN registration attempt is accepted by the GANC, a GA-RC REGISTER ACCEPT message is returned to the UE 27. This message contains the value for the TU3906 timer (i.e., the GAN Keep Alive timer). This timer is relatively simple and is running in the UE as long as the UE is registered with the GANC. Every time the TU3906 timer is triggered, the UE sends the GA-RC KEEP ALIVE message to the GANC and restarts the timer. In this embodiment of the invention, the UE may add information about the current LTE cell (i.e., TAI and E-CGI) in the GA-RC KEEP ALIVE message. This enables the GANC to handle GAN-CGI selection and GANC redirection while in CS idle mode.

Figure 14:
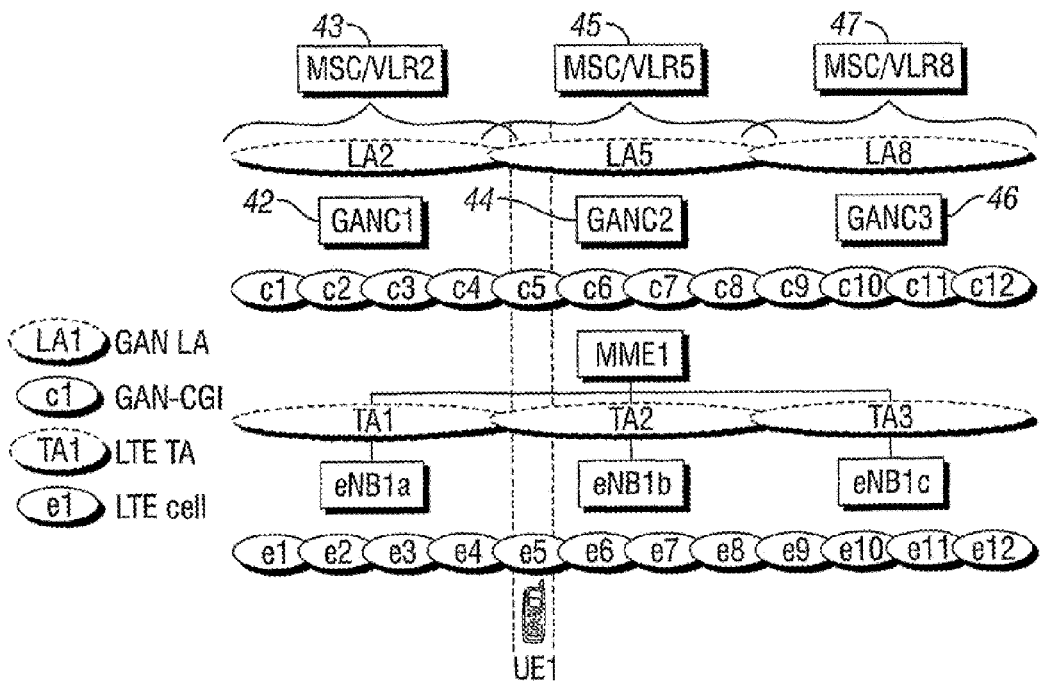
FIG. 14 illustrates an exemplary mapping from LTE cells and TA to GAN-CGI and LA in an exemplary embodiment of the present invention.

FIG. 14 illustrates an exemplary mapping from LTE cells and TA to GAN-CGI and LA suitable for utilizing with the present invention. A first TA (TA1) is served by GANC1 42 and MSC/VLR2 43. A second TA (TA2) is served by GANC2 44 and MSC/VLR5 45. A third TA (TA3) is served by GANC3 46 and MSC/VLR8 47. In this example, UE1 is located in the LTE cell e5 that belongs to TA2. The corresponding area is served in the GAN and CS CN side by the GANC2 44 and MSC/VLR5 45. The corresponding GAN-CGI used for the LTE cell e5 is c5, and LA5 corresponds to TA2.

Figure 15:
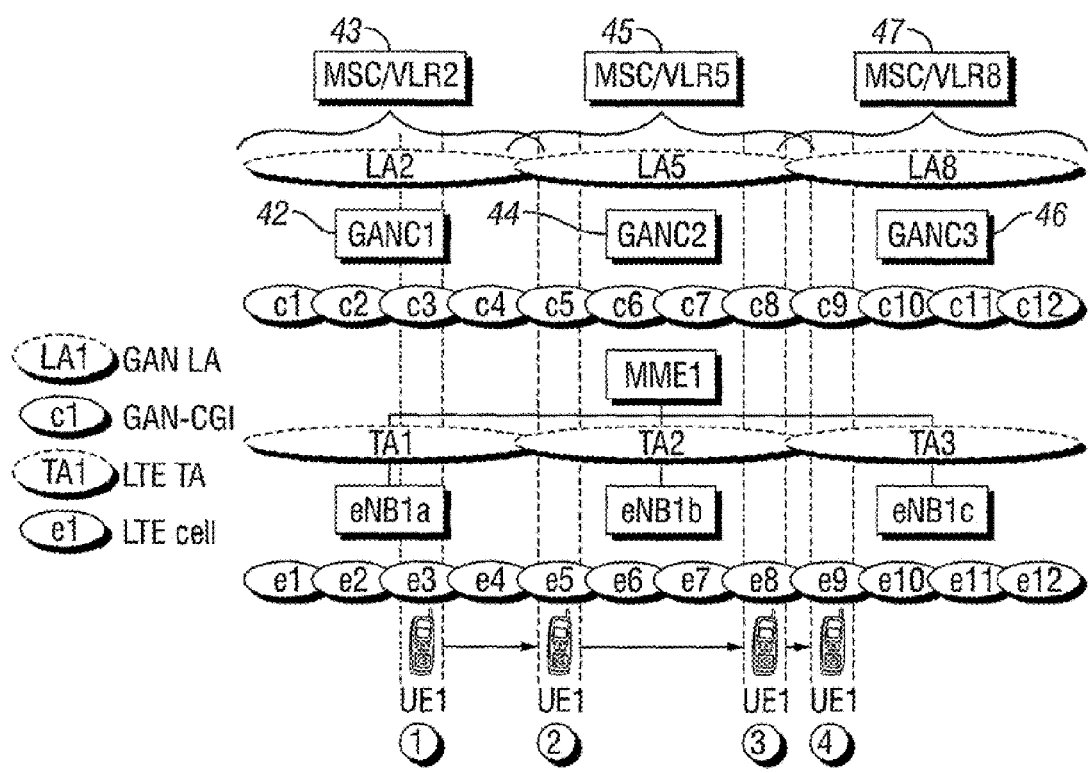
FIG. 15 illustrates relevant states and actions as a UE moves to four different locations in the LTE/SAE network in an exemplary embodiment of the present invention.

FIG. 15 illustrates relevant states and actions as UE1 moves to four different locations in the LTE/SAE network in an embodiment of the present invention.

1. UE1 is powered on in LTE-cell e3 and attaches to the LTE/SAE network. The UE1 also registers with the GANC1 42 and is in idle state.

2. UE1 is in idle state and moves in the LTE/SAE network to the LTE cell e5 where the UE performs a TAU. The TAU triggers a GAN registration update towards the GANC1 42, and GANC1 decides to redirect the UE1 to GANC2 44.

3. UE1 is in idle state and moves in the LTE/SAE network to the LTE cell e8 where an MO-call is triggered.

4. UE1 is now in active state (both in GANC/MSC and in LTE/SAE) and moves in the LTE/SAE network to the LTE cell e9 due to handover. A TAU is also triggered in this case. Either the handover or the TAU triggers UE1 to perform a GAN registration update towards the GANC2 44 to indicate the current location. Note that since UE1 is now in active state, there is no redirection to GANC3 46 before UE1 enters idle state in the GANC/MSC.

Figure 16:
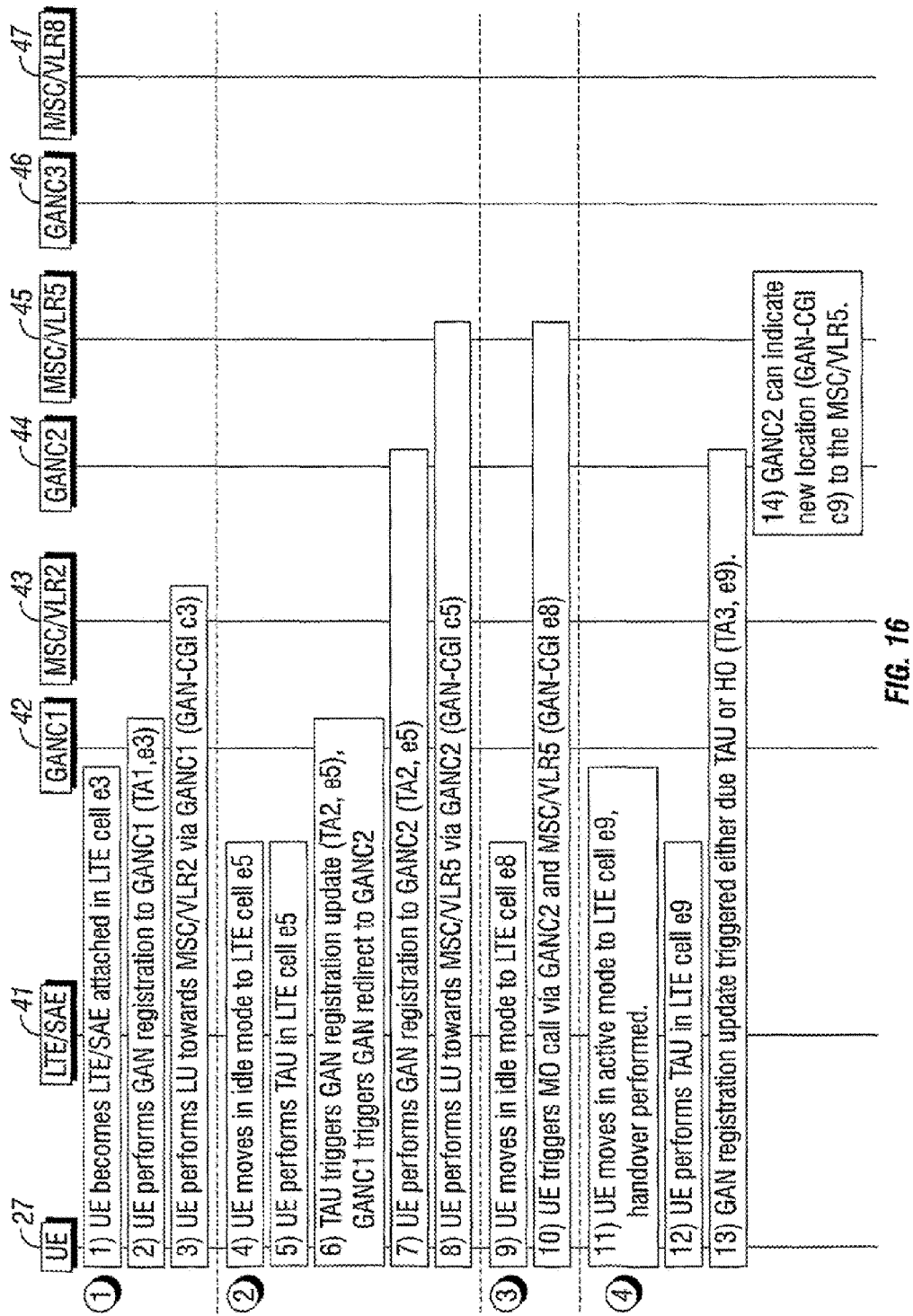
FIG. 16 illustrates the logical steps conducted by the various network nodes when performing the scenario shown in FIG. 15.

FIG. 16 illustrates the logical steps conducted by the various network nodes when performing the scenario shown in FIG. 15. Details of the logical steps are described in connection with earlier figures.

Figure 17:
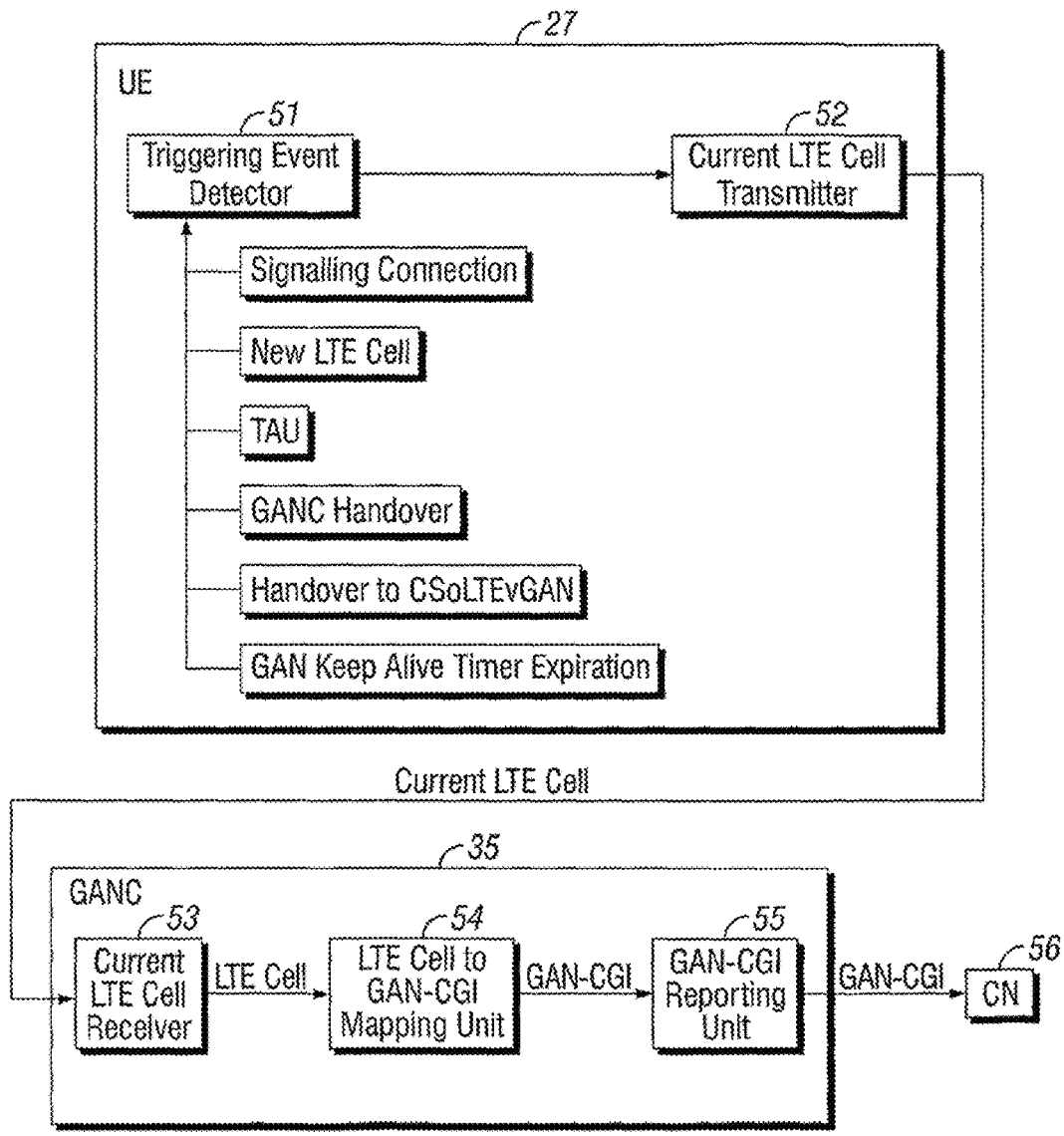
FIG. 17 is a simplified block diagram of an exemplary embodiment of the system of the present invention.

FIG. 17 is a simplified block diagram of an exemplary embodiment of the system of the present invention. The system includes the UE 27 and the GANC 35. The UE has been modified to include a triggering event detector 51 and a current LTE cell transmitter 52. A number of different events can cause the triggering event detector to instruct the current LTE cell transmitter to transmit an indication of the UE's current LTE cell over the air interface to the GAN and the GANG. These events may include:

the UE establishing a signaling connection with the GANC;

the UE moving from a first LTE cell to a second LTE cell within a single LTE TA;

the UE moving from a first LTE cell in a first TA to a second LTE cell in a second TA;

the UE performing a TAU while the UE is in CS Idle state;

the UE performing a TAU while the UE is in CS Active state;

handover of the UE from a first GANC to a second GANC while the UE is in CS Active state;

handover of the UE from a GERAN/UTRAN access network to the Circuit Switched Services over LTE Generic Radio Access Network; and expiration of a GAN Keep Alive timer in the UE.

Once the triggering event detector 51 signals the current LTE cell transmitter 52 that a triggering event has occurred, the current LTE cell transmitter transmits an indication of the UE's current LTE cell over the air interface to the GANC 35. The GANC has been modified to include a current LTE cell receiver 53, an LTE cell to GAN-CGI mapping unit 54, and a GAN-CGI reporting unit 55. The current LTE cell receiver receives the current LTE cell indication and provides it to the mapping unit. The mapping unit determines an associated GAN-CGI and provides it to the GAN-CGI reporting unit, which reports the GAN-CGI to the core network 56.

The invention is described in exemplary embodiments herein using the procedures and message names for the GAN A/Gb mode (i.e., when the GANC is connected to the core network using the A and Gb-interfaces). It should be understood, however, that the invention applies equally well for other modes and interfaces such as, for example, the GAN Iu-mode (i.e., when the GANC is connected to the core network using an Iu interface). One difference is that the message names and protocols used between the MS/UE and the GANG are different. For example, the GAN A/Gb mode message GA-CSR REQUEST is called GA-RRC REQUEST in the GAN-Iu mode. Another difference is that in the GAN Iu-mode case, the GANC utilizes GAN-SAIs (Service Area Identities) towards the core network instead of GAN-CGIs.

Regardless of the mode or interface utilized, the present invention enables the UE 27 to inform the GANC 35 about the UE's current location so that the GANC can inform the MSC 38 using existing procedures. Location-based services can then be applied for CSoLTEvGAN scenarios.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of providing a core network with a current cell location of a User Equipment (UE) operating in a Circuit Switched Services over LTE Generic Radio Access Network having a plurality of LTE cells, so that when the UE registers with a Generic Access Network Controller (GANC), from a first LTE cell of the plurality of LTE cells, the GANC selects a first GAN Cell Global Identifier (GAN-CGI) being associated with a first LTE cell of the plurality of LTE cells for reporting the location of the UE to the core network, the method comprising the steps of:

receiving by the GANC, a message from the UE reporting a current cell in which the UE is located whenever one of a group of triggering events is detected by the UE, the group of triggering events including each time the UE performs a tracking area update;

selecting by the GANC, a second GAN-CGI associated with a second LTE cell of the plurality of LTE cells if the message indicates that the UE has moved from the first LTE cell of the plurality of LTE cells to the second LTE cell of the plurality of LTE cells; and reporting by the GANC, the second GAN-CGI to the core network.

2. The method according to claim 1, wherein the receiving step includes receiving a message from the UE reporting that the UE has moved from the first LTE cell of the plurality of LTE cells to the second LTE cell of the plurality of LTE cells within a single LTE Tracking Area (TA).

3. The method according to claim 2, further comprising the steps of:

the UE performing a Tracking Area Update (TAU) whenever the UE moves to a third LTE cell of the plurality of LTE cells within a second TA;

selecting by the GANC, a third GAN-CGI associated with the third LTE cell of the plurality of LTE cells in response to the TAU; and reporting by the GANC, the third GAN-CGI to the core network.

4. The method according to claim 3, wherein the UE performs the TAU while the UE is in circuit-switched (CS) Active state.

5. The method according to claim 1, wherein the group of triggering events further includes:

the UE performing a Tracking Area Update while the UE is in circuit-switched (CS) Idle state;

the UE performing a TAU while the UE is in CS Active state; handover of the UE from a first GANC to a second GANC while the UE is in CS Active state;

handover of the UE from a GERAN/UTRAN access network to the Circuit Switched Services over LTE Generic Radio Access Network; and expiration of a GAN Keep Alive timer in the UE.

6. A method of providing a core network with a current cell location of a User Equipment (UE) operating in a Circuit Switched Services over LTE Generic Radio Access Network having a plurality of LTE cells, wherein when the UE registers with a Generic Access Network Controller (GANC) from a first LTE cell of the plurality of LTE cells, the GANC selects a first GAN Cell Global Identifier (GAN-CGI) being associated with a first LTE cell of the plurality of LTE cells for reporting the location of the UE to the core network, the method comprising the steps of:
- receiving by the GANC, a message from the UE reporting a current cell in which the UE is located whenever one of a group of triggering events is detected by the UE, the group of triggering events including each time the UE performs a tracking area update;
- determining by the GANC, whether the UE should be served by a second GANC based on one of the reported second LTE cell of the plurality of LTE cells and an associated LTE Tracking Area (TA);
- upon determining that the UE should be served by a second GANC, redirecting the UE report to the second GANC;
- selecting by the second GANC, a second GAN-CGI associated with the second LTE cell if the message indicates that the UE has moved from the first LTE cell of the plurality of LTE cells to a second LTE cell of the plurality of LTE cells; and
- reporting by the second GANC, the second GAN-CGI to the core network.

7. The method according to claim 6, wherein the UE is in circuit switched (CS) Active state, and the method further comprises performing a handover procedure from the first GANC to the second GANC, wherein the reporting step is performed in response to the handover procedure.

8. The method according to claim 6, wherein the UE is in circuit switched (CS) Active state, and the method further comprises:
- performing a handover procedure from the first GANC to the second GANC; and
- performing a Tracking Area Update (TAU) by the UE;
- wherein the reporting step is performed in response to the TAU.

9. A Generic Radio Access Network Controller, GANC, for providing a core network with a current cell location of a User Equipment (UE) operating in a Circuit Switched Services over LTE Generic Radio Access Network, the GANC comprising:
- a current LTE cell receiver for receiving an indication of the UE's current LTE cell from the UE whenever one of a group of triggering events is detected by the UE, the group of triggering events including each time the UE performs a tracking area update;
- a mapping unit for determining a GAN Cell Global Identifier (GAN-CGI) associated with the UE's current LTE cell; and
- a GAN-CGI reporting unit for reporting the GAN-CGI to the core network.

10. The GANC according to claim 9, wherein the group of triggering events further includes:
- the UE performing a Tracking Area Update (TAU) while the UE is in circuit-switched (CS) Idle state;
- the UE performing a TAU while the UE is in CS Active state; handover of the UE from a first GANC to a second GANC while the UE is in CS Active state;
- handover of the UE from a GERAN/UTRAN access network to the Circuit Switched Services over LTE Generic Radio Access Network; and
- expiration of a GAN Keep Alive timer in the UE.

11. A user equipment (UE) operating in a Circuit Switched Services over LTE Generic Radio Access Network having a plurality of LTE cells, the UE comprising:
- a registration unit configured to register the UE with a generic access network controller (GANC) from a first LTE cell of the plurality of LTE cells, to enable the GANC to report the location of the UE to a core network;
- a triggering event detector for detecting a triggering event and generating a notification that the event has occurred;
- a tracking area update unit to periodically generate a tracking area update; and
- a transmitting unit configured to send an indication of the UE's current LTE cell whenever one of a group of triggering events is detected by the UE, the group of triggering events including each time the UE performs a tracking area update.

12. The UE of claim 11, wherein the UE performs a tracking area update when the UE is in a circuit switched idle state.

13. The UE of claim 11, wherein the group of triggering events further includes:
- a handover of the UE from a first GANC to a second GANC while the UE is in a circuit switched active state;
- a handover of the UE from a GERAN/UTRAN access network to a circuit switched services over LTE generic radio access network; and
- expiration of a GAN keep alive timer in the UE.

* * * * *

UNITED STATES PATENT AND TRADEMARK OFFICE
CERTIFICATE OF CORRECTION

PATENT NO.        : 8,655,374 B2
APPLICATION NO.   : 13/141305
DATED             : February 18, 2014
INVENTOR(S)       : Vikberg et al.

It is certified that error appears in the above-identified patent and that said Letters Patent is hereby corrected as shown below:

On the Title Page, item (57), under "ABSTRACT", in Column 2, Lines 2-3, delete "Generic Radio Access Network Controller, GANG," and insert -- Generic Access Network Controller, GANC, --, therefor.

On the Title Page, item (57), under "ABSTRACT", in Column 2, Line 4, delete "GANG" and insert -- GANC --, therefor.

On the Title Page, item (57), under "ABSTRACT", in Column 2, Line 7, delete "GANG" and insert -- GANC --, therefor.

In the Specification

In Column 1, Line 46, delete "IASA Inter-Access Anchor" and insert -- IASA Inter-Access System Anchor --, therefor.

In Column 2, Line 59, delete "Inter-Access Anchor (IASA)" and insert -- Inter-Access System Anchor (IASA) --, therefor.

In Column 3, Line 45, delete "MME 13" and insert -- MME 11 --, therefor.

In Column 5, Line 12, delete "GANG" and insert -- GANC --, therefor.

In Column 5, Line 14, delete "GANG" and insert -- GANC --, therefor.

In Column 6, Line 43, delete "GANG" and insert -- GANC --, therefor.

In Column 7, Line 32, delete "GANG" and insert -- GANC --, therefor.

Signed and Sealed this
Eighth Day of July, 2014

Michelle K. Lee
*Deputy Director of the United States Patent and Trademark Office*

CERTIFICATE OF CORRECTION (continued)
U.S. Pat. No. 8,655,374 B2

In Column 8, Line 49, delete "GANG" and insert -- GANC --, therefor.

In Column 8, Line 55, delete "GANG" and insert -- GANC --, therefor.

In Column 8, Line 59, delete "GANG." and insert -- GANC. --, therefor.

In Column 8, Line 60, delete "GANG ensures" and insert -- GANC ensures --, therefor.

In Column 8, Line 60, delete "GANG is the correct GANG" and
insert -- GANC is the correct GANC --, therefor.

In Column 8, Line 62, delete "GANG" and insert -- GANC --, therefor.

In Column 9, Line 4, delete "the GANG" and insert -- the GANC --, therefor.

In Column 9, Line 4, delete "which GANG" and insert -- which GANC --, therefor.

In Column 9, Line 6, delete "GANG" and insert -- GANC --, therefor.

In Column 9, Line 7, delete "GANG" and insert -- GANC --, therefor.

In Column 9, Line 8, delete "GANG" and insert -- GANC --, therefor.

In Column 9, Line 12, delete "GANG" and insert -- GANC --, therefor.

In Column 9, Line 24, delete "GANG" and insert -- GANC --, therefor.

In Column 9, Line 26, delete "GANG" and insert -- GANC --, therefor.

In Column 9, Line 37, delete "GANG" and insert -- GANC --, therefor.

In Column 9, Line 43, delete "GANG," and insert -- GANC, --, therefor.

In Column 9, Line 45, delete "GANG" and insert -- GANC --, therefor.

In Column 9, Line 51, delete "GANG" and insert -- GANC --, therefor.

In Column 10, Line 27, delete "GANG" and insert -- GANC --, therefor.

In Column 11, Line 29, delete "GANG." and insert -- GANC. --, therefor.

In Column 11, Line 66, delete "GANG" and insert -- GANC --, therefor.